United States Patent
Massault et al.

(10) Patent No.: US 10,118,364 B2
(45) Date of Patent: Nov. 6, 2018

(54) POLYMERIC VEHICLE GLAZING WITH A FLUSH MOUNTED OPAQUE EDGE ZONE

(71) Applicant: SAINT-GOBAIN GLASS FRANCE, Courbevoie (FR)

(72) Inventors: Laetitia Massault, Magny les Compiegne (FR); Pascal Lefevre, Viry Noureuil (FR); Bastien Grandgirard, Marqueglise (FR); Luc-Henry Blanche, Hagen (DE); Marcus Guldan, Uhingen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/435,153

(22) PCT Filed: Oct. 4, 2013

(86) PCT No.: PCT/EP2013/070708
§ 371 (c)(1),
(2) Date: Apr. 10, 2015

(87) PCT Pub. No.: WO2014/067745
PCT Pub. Date: May 8, 2014

(65) Prior Publication Data
US 2015/0283786 A1  Oct. 8, 2015

(30) Foreign Application Priority Data

Oct. 30, 2012  (EP) .................................. 12190571

(51) Int. Cl.
*B32B 3/00* (2006.01)
*B32B 5/14* (2006.01)
(Continued)

(52) U.S. Cl.
CPC .............. *B32B 5/145* (2013.01); *B29C 45/16* (2013.01); *B32B 27/08* (2013.01); *B60J 1/02* (2013.01);
(Continued)

(58) Field of Classification Search
CPC ......... B32B 3/263; B32B 5/145; B32B 27/08; B32B 2250/02; B32B 2250/24;
(Continued)

(56) References Cited

U.S. PATENT DOCUMENTS 4,321,296 A  3/1982  Rougier
4,874,654 A  10/1989  Funaki et al.
(Continued)

FOREIGN PATENT DOCUMENTS

DE  3506011  8/1986
DE  19642648  4/1998
(Continued)

OTHER PUBLICATIONS

International Preliminary Report on Patentability dated May 5, 2015 for PCT/EP2013/070708 filed on Oct. 4, 2013 in the name of Saint-Gobain Glass France.
(Continued)

*Primary Examiner* — Megha M Gaitonde
(74) *Attorney, Agent, or Firm* — Steinfl + Bruno, LLP

(57) ABSTRACT

A polymeric vehicle glazing is described, having an outer face and an inner face, with a transparent polymeric component at the outer face and the inner face. An opaque polymeric component is flush mounted at the inner face in at least one section of the transparent polymeric component.

25 Claims, 8 Drawing Sheets

(51) Int. Cl.
  *B60J 1/02* (2006.01)
  *B29C 45/16* (2006.01)
  *B32B 27/08* (2006.01)
  *B60J 1/18* (2006.01)
  *B60J 7/043* (2006.01)
  *B60Q 1/04* (2006.01)
  *B60S 1/02* (2006.01)
  *B63B 19/00* (2006.01)
  *B64C 1/14* (2006.01)

(52) U.S. Cl.
  CPC .............. *B60J 1/18* (2013.01); *B60J 7/043* (2013.01); *B60Q 1/04* (2013.01); *B60S 1/026* (2013.01); *B63B 19/00* (2013.01); *B64C 1/1484* (2013.01); *B29C 2045/1682* (2013.01); *B29C 2045/1687* (2013.01); *B29K 2995/0025* (2013.01); *B29K 2995/0026* (2013.01); *B32B 2605/00* (2013.01); *B63B 2019/0007* (2013.01); *Y10T 428/24521* (2015.01)

(58) Field of Classification Search
  CPC ......... B32B 2605/00; Y10T 428/24058; Y10T 428/24132; Y10T 428/24479; Y10T 428/24521; Y10T 428/24612; Y10T 428/24942; Y10T 428/2495; B60J 1/02; B60J 1/08; B60J 1/18
  USPC ......... 428/67, 105, 112, 156, 159, 161, 169, 428/172, 173, 192, 212, 213; 359/630, 359/894; 296/84.1; 345/7
  See application file for complete search history.

(56) References Cited

U.S. PATENT DOCUMENTS

| | | | |
|---|---|---|---|
| 5,355,144 A * | 10/1994 | Walton | B32B 17/10036 |
| | | | 343/713 |
| 5,525,401 A | 6/1996 | Hirmer | |
| 6,461,704 B1 * | 10/2002 | Matsco | B29C 45/16 |
| | | | 156/100 |
| 7,220,471 B1 | 5/2007 | Oami et al. | |
| 2004/0265512 A1 | 12/2004 | Aengenheyster et al. | |
| 2006/0210772 A1 * | 9/2006 | Bui | B32B 3/263 |
| | | | 428/157 |
| 2006/0278803 A1 | 12/2006 | Mochizuki | |
| 2008/0187725 A1 * | 8/2008 | Grandhee | B32B 27/36 |
| | | | 428/195.1 |

FOREIGN PATENT DOCUMENTS

| | | |
|---|---|---|
| DE | 10147537 | 4/2003 |
| EP | 0007857 | 2/1980 |
| EP | 2394747 | 12/2011 |
| JP | S5537483 A | 3/1980 |
| JP | S63199818 U | 12/1988 |
| WO | 2011/067541 | 6/2011 |
| WO | 2011/092420 | 8/2011 |

OTHER PUBLICATIONS

Written Opinion dated Jan. 8, 2014 for PCT/EP2013/070708 filed on Oct. 4, 2013 in the name of Saint-Gobain Glass France.
International Search Report dated Jan. 8, 2014 for PCT/EP2013/070708 filed on Oct. 4, 2013 in the name of Saint-Globain Glass France.

* cited by examiner

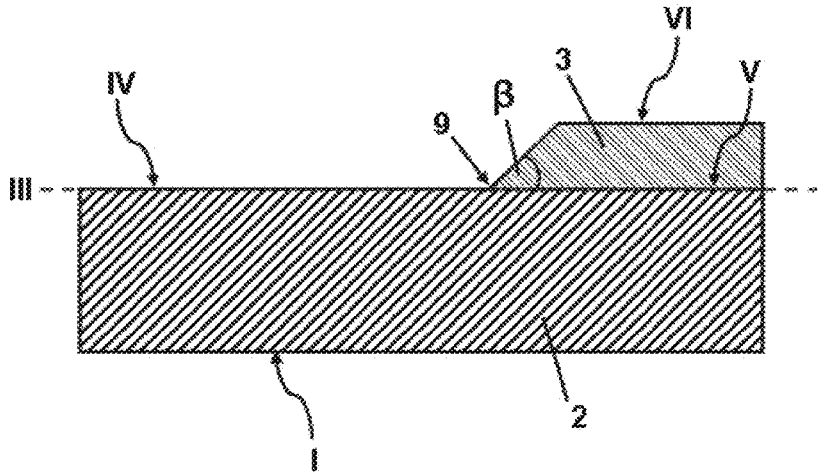

STATE OF THE ART

Figure 10

```
┌─────────────────────────────────────────────────────────────────────────┐
│ Two-component injection molding of a transparent polymeric component (2) and │
│ an opaque polymeric component (3), wherein the opaque polymeric component │
│   (3) is flush overmolded onto the transparent polymeric component (2).  │
└─────────────────────────────────────────────────────────────────────────┘
                                    │
                                    ▼
              ┌──────────────────────────────────────────┐
              │  Application of a protective coating (10) onto │
              │   the outer face (I) and/or the inner face (IV). │
              └──────────────────────────────────────────┘
                                    │
                                    ▼
          ┌──────────────────────────────────────────────────┐
          │ Application of at least one lower bus bar (5.2) onto the inner face │
          │         (IV) of the opaque polymeric component (3).          │
          └──────────────────────────────────────────────────┘
                                    │
                                    ▼
          ┌──────────────────────────────────────────────────┐
          │ Ultrasonic integration of conductive wires (4) onto the inner face │
          │           (IV) of the polymeric vehicle glazing (1).          │
          └──────────────────────────────────────────────────┘
                                    │
                                    ▼
    ┌─────────────────────────────────────────────────────────────────┐
    │ Application of an upper bus bar (5.1) on top of the lower bus bar (5.2) and │
    │  the conductive wires (4) and electrical connection of the bus bars (5) and │
    │                      the conductive wires (4).                      │
    └─────────────────────────────────────────────────────────────────┘
```

Figure 11

POLYMERIC VEHICLE GLAZING WITH A FLUSH MOUNTED OPAQUE EDGE ZONE

CROSS REFERENCE TO RELATED APPLICATIONS

The present application is the US national stage of International Patent Application PCT/EP2013/070708 filed internationally on Oct. 4, 2013 which, in turn, claims priority to European Patent Application No. 12190571.5 filed on Oct. 30, 2012.

The invention relates to a polymeric vehicle glazing with a flush mounted opaque edge zone, a method of its production and its use.

Continuous attempts to reduce the weight of vehicles give rise to new requirements for automotive glazing, which should have a lightweight design without a loss of function. Polymeric vehicle glazing is often used as rear window, sidelite, roof window or vehicular lamp.

Automotive glazing is often equipped with electrical conducting structures for heater function or antenna function. Electrical conducting structures can be applied on glass panes by printing a silver containing paste onto the glass surface and subsequent burning in of the paste. These conductive structures are connected to the on-board electronics by electrical connectors soldered on bus bars.

Plastic glazing is also advantageous for use in electrically powered cars due to its low weight. The engine of electric cars does not produce enough waste heat to be utilized for heating, which makes an electric method of heating necessary to keep the vehicle glazing free of ice and fog. Furthermore an antenna function implemented in the polymeric glazing can be desirable.

Electrically conducting structures printed on polymeric glazing are already disclosed in U.S. Pat. No. 5,525,401 A. Another method for forming electrically conducting structures on polymeric glazing is the application of thin wires onto the surface. Thereby wires and if necessary bus bars are applied onto a thin polymeric film, which is subsequently bonded to the glazing. The polymeric film is either glued to the glazing or bonded by film insert molding. In film insert molding the use of a separate adhesive binding is redundant. Such solutions are described in DE 35 06 011 A1, EP 7 857 B1 and DE 101 47 537 A1. The wires are secured between the polymeric film and the glazing and are protected against damage.

WO 2011/067541 and US 2006/0278803 disclose methods for ultrasonic integration of conducting wires into the surface of a polymeric glazing. The polymeric glazing comprises a polymeric material into which a conducting wire is partially sunk.

U.S. Pat. No. 7,220,471 B1 discloses a polymeric window comprising an opaque printing within the peripheral region of the glazing covered by a support film.

WO 2011/092420 A2 discloses a luminous vehicle glazing, wherein a light source is masked by an opaque zone within a main body of the glazing. In one particular embodiment the opaque zone is flush with the main body of the glazing.

DE 196 42 648 A1 discloses a polymeric vehicle glazing, in which a bulge of the window is concealed by a second polymeric component applied on the outer or inner side of the glazing.

The installation of the glazing is mostly realized by gluing the edge of the glazing to the car body. For that reason the edge of the glazing is equipped with a frame on which an adhesive is applied. Usually this frame comprises an opaque polymeric component which hides the adhesive surface. The opaque polymeric component can also be utilized to hide the electrical connection of a polymeric glazing with heating function or antenna function. In this case conductive wires have to be embedded not only in the transparent polymeric component of the glazing but also in the opaque polymeric component. According to the state of the art the opaque polymeric component is applied on the inner surface of the transparent polymeric component, whereas the lateral edge of the opaque polymeric component, which is oriented towards the middle of the glazing, is chamfered. Thus embedding of conductive wires has to be accomplished on the slope of the opaque polymeric component to enable a connection to the electrical connector on the upper planar surface of the opaque polymeric component. However the chamfered edge of the opaque polymeric component exhibits a hindrance for ultrasonic integration of wires as the sonotrode does not reach into the corner and the wires are not embedded satisfactorily. Thus the embedding at the slope and at the junction point between transparent material and opaque material is insufficient and the risk for an accidental removal and damage of the wires is high.

Furthermore the driver's vision can also be affected by a protective coating applied on the inner and the outer surface of the glazing. A protective coating on the surface guarantees the durability of the glazing by avoiding surface defects and scratches. Coating of plastic glazing comprising two polymeric components according to the state of the art results in protective coatings of sub-optimum quality. In a flow coating process the coating accumulates in the corners of the glazing at the point where the opaque component is mounted onto the transparent component. In polymeric glazing according to the state of the art this point is located within the visible area and the emerging optical distortions impair the driver's vision. This coating accumulation is causing optical distortion and lowers the quality of the transparent area of the window.

The object of the present invention is to provide a new design for polymeric vehicle glazing with a transparent polymeric component and an opaque polymeric component in the edge zone, wherein the driver's vision is improved, the weight of the glazing is reduced and the ultrasonic embedding of conductive wires is enhanced.

The solution of the object of the present invention is a polymeric vehicle glazing with a flush opaque edge zone, a method for its production and its use according to independent claims 1, 13 and 15.

The polymeric vehicle glazing comprises a transparent polymeric component with an outer face and an inner face and an opaque polymeric component flush mounted at the inner face. The outer face is defined as the surface that is in direct contact with the environment after assembly, while the inner face is oriented towards the vehicle interior. The opaque polymeric component is installed in at least one section of the inner face, preferably only in the edge region. The line at which the transparent polymeric component, the opaque polymeric component and the ambient air are in direct contact is defined as the junction point. The inner face at the junction point between both components is even and without any slope as the opaque polymeric component is flush mounted onto the transparent polymeric component. This flush-design provides a plane transition between both components Furthermore the polymeric vehicle glazing comprises a first interior face and a second interior face, which are parallel to the outer face. The first interior face is defined as the nearest parallel to the outer face, which passes the transparent polymeric component and the opaque polymeric component. The second interior face is defined as the most distant parallel to the outer face, which passes the transparent polymeric component and the opaque polymeric component. Glazing is often curved to fulfill the demands on optically appealing vehicle glazing. If the surfaces of the glazing are curved the tangent planes of all surfaces are used. The flush junction point of the transparent polymeric component and the opaque polymeric component is located at the second interior phase, which may be completely or partly identical to the inner face. The plane in which both components are in direct contact is defined as the interface. The interface always runs between the second interior face and the first interior face. At the junction point the interface deviates at an angle $\alpha$ of 20° to 100° from the second interior face towards the first interior face.

The interface changes its slope at least once, wherein one transition between different slopes lies 0.1 mm to 1 mm beneath the second interior face. At the junction point the interface deviates from the second interior face at an angle $\alpha$ of 20° to 100° towards the first interior face. In its further progression the interface changes its slope and deviates from the second interior face at an angle $\alpha_1$ of 10° to 60° towards the first interior face in at least one section of the interface. Hence the interface exhibits a steeper slope at the junction point and smaller slope in at least one other section. The initial steeper slope at the junction point followed by a smaller slope leads to formation of a small wall, whose height equates the distance between the first point of transition between slopes and the second interior face. This can be advantageous in the manufacturing process as an overflowing of the opaque polymeric material can be avoided. At the same time the demolding process is optimized by avoiding areas in which the interface is perpendicular to the second interior face.

The simplest embodiment of a vehicle glazing with flush design consist of a transparent component with a flush mounted opaque component, wherein the interface and the second interior face form an angle of 90° in the direction of the first interior face at the junction point and the interface traverses along the first interior face afterwards. Thus the transparent component of this embodiment provides a rectangle recess in which the opaque component is laid in flush. Such an arrangement fulfills the needs for a geometry suitable for easy wire embedding as there is no slope at the junction point between transparent and opaque material. This simple embodiment could lead to difficulties during the manufacturing process as shark angles could be problematic in molding processes. The cavity is often not filled correctly and the demolding is difficult. Geometries in which large areas of the interface are perpendicular to the second interior face should be avoided. Hence this conceptual geometry has to be be adjusted further by a change of the slope of the interface as discussed above to improve and simplify the manufacturing process.

Flush-design provides a plane transition between both components at which the coating can flow without disturbance in a flow coating process. As the surface at the junction point between both components is flush there is no corner where the coating or air bubbles within the coating might accumulate within the visual field of the glazing. An increased thickness of the coating in the corner and the accumulation of air bubbles in the corner lead to visual irregularities of the work piece. Thus the part is rejected. Hence the vehicle glazing according to the invention reduces the rejects during the coating process and thereby the costs.

In a preferred embodiment of the invention the interface changes its slope at least once, wherein one transition between different slopes lies 0.3 mm to 0.6 mm beneath the second interior face. At the junction point the interface deviates from the second interior face at an angle $\alpha$ of 50° to 90°, towards the first interior face. In its further progression the interface changes its slope and deviates from the second interior face at an angle $\alpha_1$ of 25° to 45°, towards the first interior face in at least one section of the interface. Hence the interface exhibits a steeper slope at the junction point and smaller slope in at least one other section. These preferred angles are particularly advantageous in the manufacturing process and demolding process.

In a preferred embodiment of the invention the inner face deviates at an angle $\beta$ of 10° to 100°, preferably 20° to 60°, from the second interior face towards the periphery within at least one section of the opaque polymeric component. Hence the thickness of the polymeric vehicle glazing increases towards the edge region. Preferably the inner face of the polymeric vehicle glazing is still planar in the region of the junction point between the transparent polymeric component and the opaque polymeric component. The section of the opaque polymeric component which is directly neighboring the junction point is identical to the second interior face, whereas the distance between the junction point and the slope of the opaque polymeric component is between 5 mm and 30 mm, preferably 10 mm to 20 mm.

In another preferred embodiment of the polymeric vehicle glazing the adhesive surface (VI) is identical to the inner face and the angle $\beta$ is $\beta=0°$. Hence no sloped part of the opaque polymeric component is needed. This design allows an enlargement of the transparent surface as the length of the opaque polymeric component is reduced compared to a glazing according to the state of the art. Furthermore this design is advantageous for weight reduction and for packing space.

The edge region of the polymeric vehicle glazing is assumed to be flat and without curvature by approximation. For glazing exhibiting a strong curvature in its edge region the tangent planes are used. If the curvature of the inner face and the outer face differs the first interior face and the second interior face are referred to the inner face.

In a preferred embodiment of the invention the inner face comprises an adhesive surface, which is parallel or identical to the second interior face. Preferably the adhesive surface sets off against the second interior face by 0.5 mm to 10 mm, preferably 1 mm to 5 mm. The adhesive surface can be used to install the polymeric vehicle glazing by gluing the adhesive surface to the car body. Preferably the adhesive surface is not identical to the second interior face, whereby the lower surface of the opaque polymeric component provides enough space for the electrical connectors. Such a design is especially advantageous as the electrical connectors and the adhesive are hidden by the opaque polymeric component.

Preferably at least one conductive wire is comprised on the inner face of the polymeric vehicle glazing, while the inner face of the opaque polymeric component provides at least two electrical connectors. Application of a potential to the electrical connectors leads to a current flow through the conductive wires, which heat up consequently.

The electrical connector comprises an upper bus bar and a lower bus bar. At least one conductive wire is electrically connected to the bus bars. Preferably two or more conductive wires are embedded on the inner face of the polymeric vehicle glazing. One or more of the bus bars are affixed to the conductive wires by soldering. Preferably only the upper bus bar is soldered onto the conductive wires, while the pressure of the upper bus bar soldering is sufficient for adhesion between the lower bus bar and the conductive wires. The lower bus bar is glued to the inner face of the opaque polymeric component, preferably by use of adhesive tape.

Preferably the bus bars comprise tungsten, copper, nickel, manganese, aluminium, silver, chromium and/or iron and/or mixtures or alloys thereof, more preferably tungsten and/or copper. The bus bars have got a thickness of 10 µm to 200 µm, preferably 50 µm to 100 µm, whereas the width of the bus bars is preferably 2 mm to 100 mm, more preferably 5 mm to 20 mm. The length of the bus bars varies in a wide range as it has to be adjusted to the requirements of the particular glazing. The minimal length of the bus bars is given by the maximum distance of the two most distant ends of the conductive wires, which should be connected to the same bus bar. The length of the bus bars can for example vary between 5 cm and 1 m. The bus bars are connected to an external power supply and an electrical potential is generated between the bus bars on two different edges of the glazing, which causes the flow of a current through the conductive wires between one electrical connector and the other electrical connector.

The opaque polymeric component forms a circumferential frame enclosing the transparent polymeric component. If a heating function or an antenna function should be implemented in the polymeric vehicle glazing one or more conductive wires are embedded into the transparent polymeric component and a part of the opaque polymeric component. Preferably two opposite edges of the glazing carry bus bars on the inner face of the opaque polymeric component, which are connected to the conductive wires. The other edges of the glazing are equipped only with the opaque polymeric component. Alternatively the bus bars can be applied on the same edge of the glazing, neighboring each other. Such a design is for example used in combination with U-shaped conductive wires. The polymeric vehicle glazing is assembled by applying an adhesive on the circumferential adhesive surface and gluing it to the car body.

The conductive wires are embedded into the surface of the polymeric vehicle glazing in at least one section of each wire. Preferably the embedding of the conductive wires is accomplished on the full length of the transparent polymeric component and in a first section of the opaque polymeric component. By doing so a mechanically stable connection between the conductive wires and the glazing is achieved, which protects the conductive wires against damage. The wires protrude from the polymeric material on the inner face of the glazing in one region of the opaque polymeric component, where they are connected to the bus bars. Preferably the outer ends of the wires are embedded to the polymeric material again. This design is advantageous as it enables a stable electrical contacting, which is hidden by the opaque polymeric component and not recognizable after installation of the glazing. Furthermore the wires are secured against accidental removal, which enhances the life time of the glazing and is beneficial for passengers safety.

The conductive wires can proceed in every direction, preferably horizontal or vertical to the edges of the glazing. Preferably the conductive wires proceed linearly between the opposite edges carrying the bus bars. Alternatively the conductive wires may proceed wave-like, in a meandering pattern or in a zigzag-shaped pattern. In a preferred embodiment the distance between two neighboring conductive paths is constant over the length of the glazing. Alternatively the distance between neighboring conductive paths could change over the length of the glazing.

The conductive wires contain at least one metal, preferably tungsten, copper, nickel, manganese, aluminium, silver, chromium and/or iron, and mixtures and/or alloys thereof. Even more preferably tungsten and/or copper are used as these materials result in particularly high heating output. The thickness of the conductive wires is preferably between 15 µm and 200 µm, more preferably between 25 µm and 90 µm. The thickness of the wires should be relatively small as the transparency of the glazing is impaired and the risk of short circuits is enlarged by increasing wire thickness. In a preferred embodiment of the invention conductive wires containing tungsten and exhibiting a thickness of 15 µm to 100 µm, preferably 25 µm to 70 µm, are employed. Alternatively conductive wires comprising copper and holding a thickness between 25 µm and 200 µm, preferably between 60 µm and 90 µm, can be used.

The distance between two neighboring conductive wires is preferably 3 mm to 30 mm, more preferably 6 mm to 20 mm, which is advantageous concerning the transparency of the glazing and the distribution of the generated heat output. Nevertheless the distance between neighboring conductive wires may vary in a wide range as it has to be adjusted to the requirements of the particular glazing.

The conductive wires are embedded by 50% to 90%, preferably 60% to 75%, in relation to the thickness of the wires.

The thickness of the transparent polymeric component varies across the glazing, wherein in the edge region of the glazing the thickness of the transparent polymeric component is smaller than in the centre of the glazing. The maximum thickness of the transparent polymeric component is between 1 mm and 20 mm, preferably between 2 mm and 8 mm, even more preferably between 4 mm and 7 mm. This range of values is particularly beneficial because of the mechanical strength of the glazing and its further processing. In general the thickness of the glazing can vary by a wide range and depends on the desired application field. Preferably the thickness of the opaque polymeric component varies across the glazing, but might also stay constant. In a preferred embodiment the adhesive surface of the opaque polymeric component exhibits a height offset against the second interior face and thus the thickness of the opaque polymeric component increases towards the edge region of the glazing. The maximum thickness of the opaque polymeric component is between 0.5 mm and 15 mm, preferably between 2 mm and 8 mm, more preferably between 3 mm and 5 mm. The opaque polymeric component is sunken into the transparent polymeric component by a maximum of 0.2 mm to 5 mm, preferably 0.3 mm to 3 mm, even more preferably 1.5 mm to 2.5 mm in relation to the second interior face.

The transparent polymeric component contains polyethylens (PE), polycarbonates (PC), polypropylens (PP), polystyrenes, polybutadienes, polynitriles, polyesters, polyurethanes, polymethylmethacrylates, polyacrylates, polyamides, polyethylenterephthalate, acrylonitrile butadiene styrene (ABS), styrene-acrylonitrile (SAN), acrylic ester styrene acrylonitrile (ASA), acrylonitrile butadiene styrene/polycarbonate (ABS/PC), polycarbonate/acrylonitrile butadiene styrene (PC/ABS), and/or mixtures or copolymers thereof. Preferably the transparent polymeric component comprises polycarbonate (PC) and/or polymethylmethacrylate (PMMA). Those materials are especially advantageous concerning the transparency, the proceeding, the mechanical strength, the resistance to weather and the chemical resistance of the transparent polymeric component.

The transparent polymeric component is in at least one section transparent. The transparent polymeric component can be colorless, colored, tinted, limpid or turbid.

The opaque polymeric component comprises polyethylens (PE), polycarbonates (PC), polypropylens (PP), polystyrenes, polybutadienes, polynitriles, polyesters, polyurethanes, polymethylmethacrylates, polyacrylates, polyamides, polyethylenterephthalate (PET), acrylonitrile butadiene styrene (ABS), styrene-acrylonitrile (SAN), acrylic ester styrene acrylonitrile (ASA), acrylonitrile butadiene styrene/polycarbonate (ABS/PC), polycarbonate/acrylonitrile butadiene styrene (PC/ABS), polycarbonate/polyethylenterephthalate (PC/PET) and/or mixtures or copolymers thereof. Preferably polycarbonate (PC), polyethyleneterephthalate (PET) and/or polymethylmethacrylate (PMMA) are comprised in the opaque polymeric component, even more preferably acrylonitrile butadiene styrene/polycarbonate (ABS/PC) or polycarbonate/polyethylenterephthalate (PC/PET) are comprised.

Preferably the opaque polymeric component comprises at least one colorant, which creates its opacity. The colorant contains inorganic colorants, organic colorants, pigments and/or mixtures thereof. Colorants suitable for this application are known by a person skilled in the art and can be obtained from the Colour Index of the British Society of Dyers and Colourists and the American Association of Textile Chemists and Colorists. The colorant can hold diverse colors. Usually a black opaque component is desired, whereas a black pigment is used in preference. Examples for black pigments suitable as colorants for the black component are carbon black, aniline black dye, animal charcoal, black iron oxide, black spinel, graphite and/or mixtures thereof. Alternatively it could be desirable to choose the colorant matching the vehicle color.

Furthermore the opaque component may contain inorganic or organic fillers, preferably $SiO_2$, $Al_2O_3$, $TiO_2$, clay minerals, silicates, calcium carbonate, talc, zeolites, glass fibers, carbon fibers, glass spheres, cullet, organic fibers and/or mixtures thereof. The use of fillers enhances the stability of the opaque component and can be advantageous to reduce the production costs as the percentage of pricier polymeric material can be lowered.

The polymeric vehicle glazing is preferably equipped with a protective coating on at least one side of the glazing, most preferably on the inner face and the outer face of the glazing. The protective coating protects the polymeric vehicle glazing against environmental influences and avoids scratches on the surface of the glazing. Preferably thermohardening or UV-curable lacquer containing polysiloxanes, polyacrylates, polymethacrylates and/or polyurethanes are utilized. The protective coating may contain further ingredients like colorants, UV-opaque components, preservatives and components enhancing the scratch resistance (e.g. nanoparticles). Suitable coatings are purchasable by the company Momentive with the product names AS4000, AS4700, PHC587 and UVHC300. The protective coating has got a thickness of 1 μm to 50 μm, in preference 2 μm to 25 μm.

Furthermore the invention comprises a process of manufacturing a polymeric vehicle glazing. In a first step an opaque polymeric component is flush overmolded onto a transparent polymeric component in a two-component injection molding process. Preferably the two component injection technology is used, wherein the transparent polymeric component is injected into the cavity at first and the opaque polymeric component is overmolded onto the transparent one. In a second step of the process according to the invention the glazing is equipped with a protective coating on at least one side of the glazing. In a third step of the process at least one lower bus bar is applied onto the inner face of the opaque component. The fourth step of the process comprises the ultrasonic integration of conductive wires onto the inner face of the polymeric vehicle glazing. The ultrasonic integration is performed by driving a sonotrode over the inner face of the polymeric vehicle glazing, wherein the sonotrode transfers ultrasonic vibrations onto the wires and the polymeric vehicle glazing. These high frequency mechanical vibrations generate thermal energy, which causes a melting of the surface layer of the polymeric material. The sonotrode carries a conductive wire in its tip, from which the said conductive wire is integrated into the molten material. The sonotrode is operated by a robot system whose control program is adjusted to the three-dimensional geometry of the polymeric vehicle glazing. The conductive wires are embedded partially in the transparent and the opaque polymeric component and protrude completely from the polymeric vehicle glazing in the region of the bus bars. Thereafter the conductive wires are preferably embedded to the opaque polymeric component again. Thus the sonotrode is driven over the surface of the transparent polymeric component, the junction point and part of the opaque polymeric component, lifted up in the region of the lower bus bar and lowered again onto the surface of the opaque polymeric component afterwards. After that the upper bus bar is attached on top of the lower bus bar carrying the conductive wires and an electrical connection between the bus bars and the conductive wires is established. The electrical connection between the bus bars and the wires can be obtained by application of a conductive adhesive, by soldering or by welding. Preferably the upper bus bar is soldered onto the conductive wires, while the pressure of the upper bus bar soldering is sufficient for an adhesion of the lower bus bar and no solder is required. Alternatively both bus bars could be attached to the conductive wires by soldering. The lower bus bar is attached to the inner face of the opaque component, preferably by application of an adhesive, more preferably by double-faced adhesive tape.

The polymeric vehicle glazing is equipped with a protective coating on the outer and/or the inner face, preferably on both sides. The protective coating is preferably applied before the embedding of the conductive wires and the installation of the bus bars. The protective coating is applied by dip coating, flow coating, roll coating, spray coating, spin coating or in-mold-coating, preferably flow coating and cured by heating or exposure to ultraviolet light waves.

Furthermore the coating process of the polymeric vehicle glazing according to the invention is more economical compared to the state of the art, as fewer parts are rejected because of defects like air bubbles, microcracks, flow lines or flow waves. In the state of the art design, those defects are resulting from the coating flow disturbance and its consequent accumulation at the end of the opaque polymeric component, where it connects to the transparent polymeric component. This connection builds up a ramp in the state of the art design, instead of staying flush as achieved by the new design according to the invention. In this design according to the invention, the coating can flow from the transparent area further to the opaque area of the glazing and vice versa without significant disturbance.

Another object of the invention is the use of a polymeric vehicle glazing as automotive glazing, glazing for aviation, glazing for rail vehicles, ship glazing, preferably as backlite, sidelite or windshield in automotives, or as lamp cover, preferably as cover for headlamps.

Further advantages and details of the present invention can be taken from the description of several exemplary embodiments with reference to the drawings.

FIG. 1b shows an enlarged view of the junction region of the polymeric vehicle glazing according to FIG. 1a.

FIG. 10 shows a polymeric vehicle glazing according to the state of the art.

FIG. 11 shows a flowchart of the process for manufacturing a polymeric vehicle glazing according to the invention.

Figure 1A:
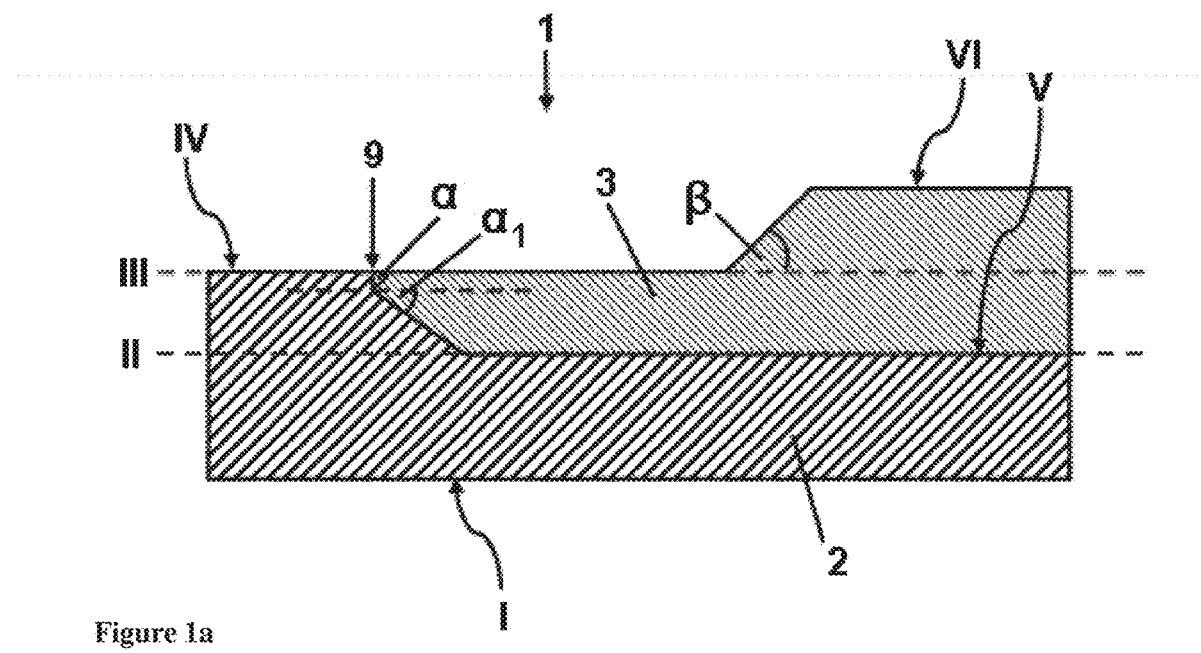
FIG. 1a shows the first embodiment of the polymeric vehicle glazing according to the invention wherein the opaque polymeric component is flush mounted onto the transparent polymeric component.

FIG. 1a shows a first embodiment of the polymeric vehicle glazing (1) according to the invention shown, wherein the opaque polymeric component (3) is flush mounted onto the transparent polymeric component (2). Only the edge region of the glazing is shown. The outer face (I) of the polymeric vehicle glazing (1) is directed towards the environment, while the inner face (IV) of the glazing points towards the interior of the vehicle. The opaque polymeric component (3) is flush mounted into the transparent polymeric component (2) on the inner face (IV). Flush mounting of the opaque polymeric component (3) generates a planar junction point (9) between the transparent polymeric component (2) and the opaque polymeric component (3). The maximum thickness of the transparent polymeric component (2) is 5.5 mm, whereas it decreases to 3.5 mm in the edge region of the glazing. The opaque polymeric component (3) has got a maximum thickness of 5 mm, which is achieved in the edge region of the glazing and is sunken into the transparent polymeric component (2) by 2 mm in relation to the second interior face (III). The transparent polymeric component (2) and the opaque polymeric component (3) are in direct contact at the interface (V). The line in which the opaque polymeric component (3), the transparent polymeric component (2) and the ambient air are in direct contact is referred to as the junction point (9). A first interior face (II), which is the nearest parallel to the outer face (I) passing the opaque polymeric component (3) and the transparent polymeric component (2), and a second interior face (III), which is the most distant parallel to the outer face (I) passing the opaque polymeric component (3) and the transparent polymeric component (2), are defined. The interface (V) proceeds between the first interior face (II) and the second interior face (III) over its full length. Initially the interface (V) and the first interior face (II) form an angle α 90° at the junction point (9). Afterwards the slope of the interface (V) changes, wherein the angle $\alpha_1$ between the second interior face (III) and the interface (V) is 35°. The transition between these two slopes lies 0.4 mm beneath the surface of the inner face (IV). The initial steep slope of the interface (V) at the junction point (9) followed by a smaller slope leads to the formation of a wall with a height of 0.4 mm. This design avoids an overflowing of the opaque polymeric component (3) during the two-component injection molding process. The interface proceeds towards the first interior face (II) and runs identically to the first interior face (II) subsequently. Hence sharp angles of the interface (V) are avoided, which improves the demolding of the transparent polymeric component (2) and the filling of the opaque polymeric component (3). The angle α is defined as the angle between the interface (V) and the second interior face (III) at the junction point (9). Initially the interface (V) deviates from the junction point (9) at an angle of α=90° towards the first interior face (II). Afterwards the slope of the interface (V) changes, wherein the angle between the second interior face (III) and the interface (V) after this first transition of slopes is defined as $\alpha_1$. The transition between these two slopes lies 0.4 mm beneath the surface of the inner face (IV). The interface (V) deviates from the second interior face (III) towards the first interior face (II) at an angle of $\alpha_1$=35°. The angle β in which the inner face (IV) deviates from the second interior face (III) towards the periphery in one section of the opaque polymeric component (3) is β=50°. Thus the thickness of the opaque polymeric component (3) increases towards the edge of the glazing. The distance between the junction point (9) and this slope of the inner face (IV) is 15 mm. The section of the inner face (IV), which is directly neighboring the edge of the glazing, runs parallel to the second interior face (III) and is defined as the adhesive surface (VI). The adhesive surface (VI) is used to integrate the polymeric vehicle glazing (1) into a vehicle body by applying an adhesive onto the adhesive surface (VI). The adhesive surface (VI) has got a height offset of 3 mm against the second interior face (III).

Figure 1B:
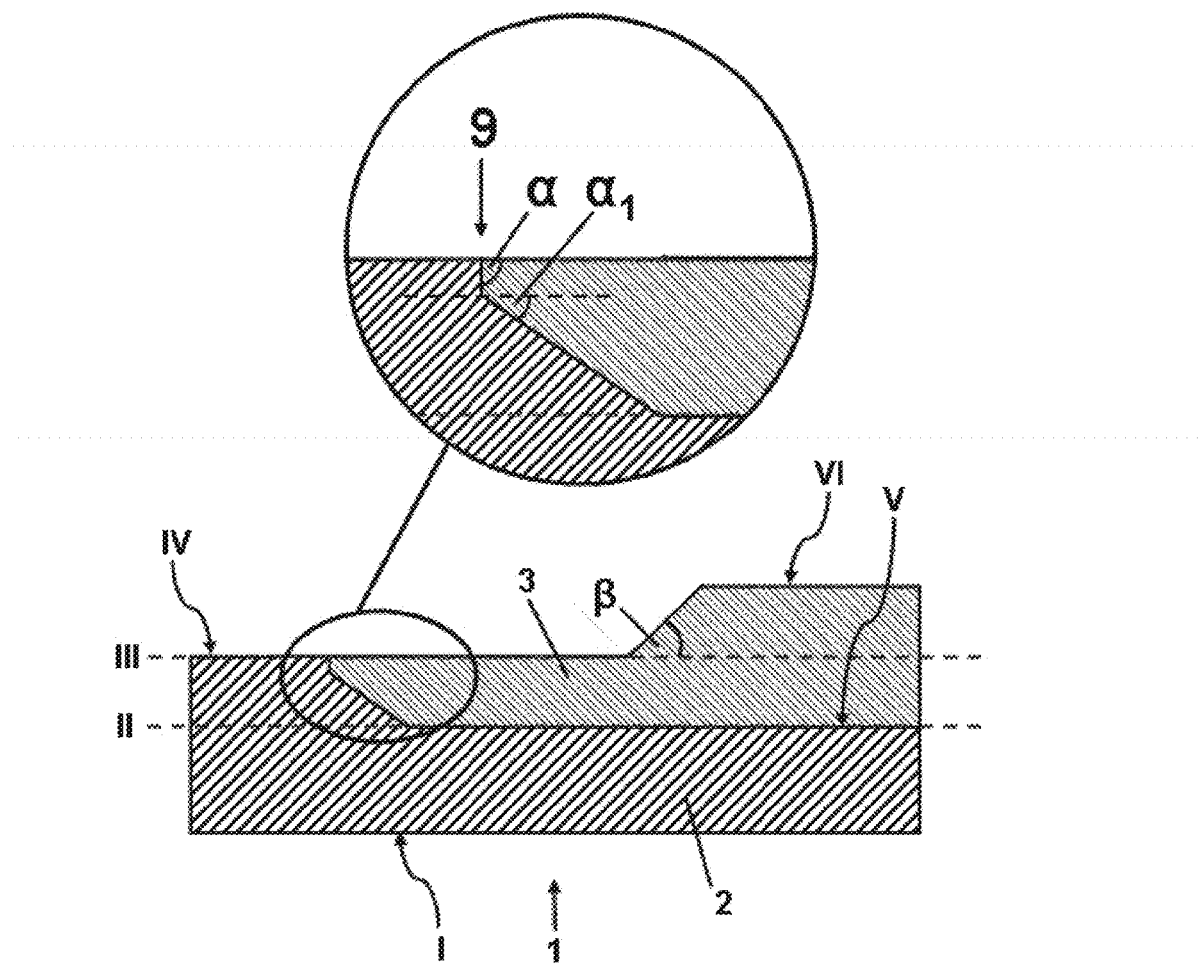

FIG. 1b shows an enlarged view of the junction region of the polymeric vehicle glazing according to FIG. 1a. Only the edge region of the glazing is shown. The junction point (9) is defined as the point where the opaque polymeric component (3), the transparent polymeric component (2) and the ambient air meet. The junction point (9) lies at the second interior face (III) and is depicted as a single point in the present cross-sectional view, whereas it forms a circumferential line in top view (see FIG. 8). The interface (V) and the second interior face (III) form an angle cc at this junction point (9), wherein the interface (V) proceeds towards the first interior face (II). In the present embodiment the angle α is α=90°, whereby the interface (V) runs vertical to the second interior face (III) and forms a small wall before it changes its slope again and forms an angle $\alpha_1$ with the second interior face (III) afterwards. The angle $\alpha_1$ is determined by the use of a line parallel to the second interior face (III), which crosses the point in which the slope of the interface (V) changes for the first time. The slope of the interface (V) can change several times in its further progression. In the present embodiment the interface proceeds to the first interior face (II) and runs along the first interior face (II).

Figure 1C:
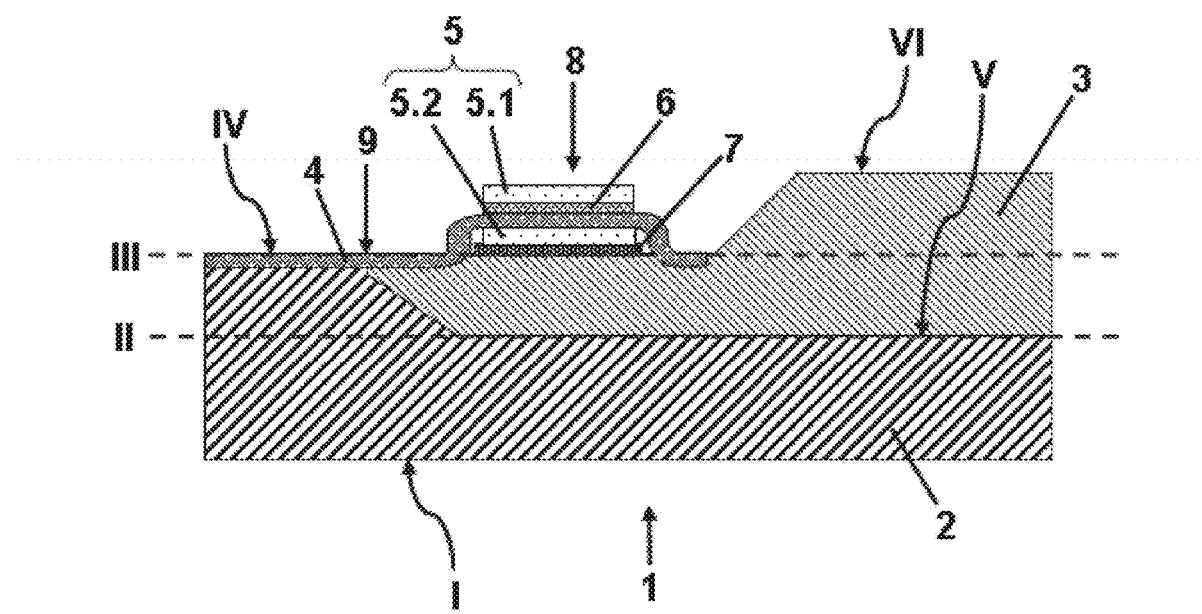
FIG. 1c shows a first embodiment of the polymeric vehicle glazing according to the invention equipped with conductive wires and an electrical connector.

FIG. 1c shows the first embodiment of the polymeric vehicle glazing (1) depicted in FIG. 1a equipped with conductive wires (4) and an electrical connector (8). Only the edge region of the glazing is shown. Flush design of the polymeric vehicle glazing (1) according to the invention enables an easy embedding of the conductive wires (4) on the inner face (IV) by ultrasonic integration as the sonotrode can be driven over a flush surface without hindrance by slopes. The electrical connector (8) is applied on the inner face (IV) in the area of the opaque polymeric component (3), where it is particularly advantageous covered by the opaque polymeric component (3). The conductive wires (4) are embedded into the transparent polymeric component (2) and the opaque polymeric component (3), where they protrude and are connected to the electrical connector (8). Afterwards the ends of the conductive wires (4) are embedded onto the opaque polymeric component (3) again. The electrical connector (8) comprises an upper bus bar (5.1), which is attached to the conductive wires (4) by solder (6), and a lower bus bar (5.2), which is attached to the conductive wires (4) by the pressure of the upper bus bar soldering. The conductive wires (4) are enclosed by the bus bars (5), whereas the lower bus bar (5.2) is attached to the inner face (IV) of the opaque polymeric component (3) by double-faced adhesive tape (7). The inner face (IV) of the transparent polymeric component (IV), the junction point (9) and the inner face (IV) of the opaque polymeric component (3), in which the electrical connector (8) is located, are identical to the second interior face (III). The thickness of the opaque polymeric component (3) increases in the region between the connector (8) and the edge of the glazing, wherein inner face (IV) deviates from the second interior face (III) at an angle of β=50° towards the periphery in one section. The distance between the junction point (9) and this slope of the inner face (IV) is 15 mm. The section of the inner face (IV), which is directly neighboring the edge of the glazing, runs parallel to the second interior face (III) and is defined as the adhesive surface (VI). The adhesive surface (VI) is used to integrate the polymeric vehicle glazing (1) into a vehicle body by applying an adhesive onto the adhesive surface (VI). The adhesive surface has got a height offset of 3 mm against the second interior face (III).

Figure 2:
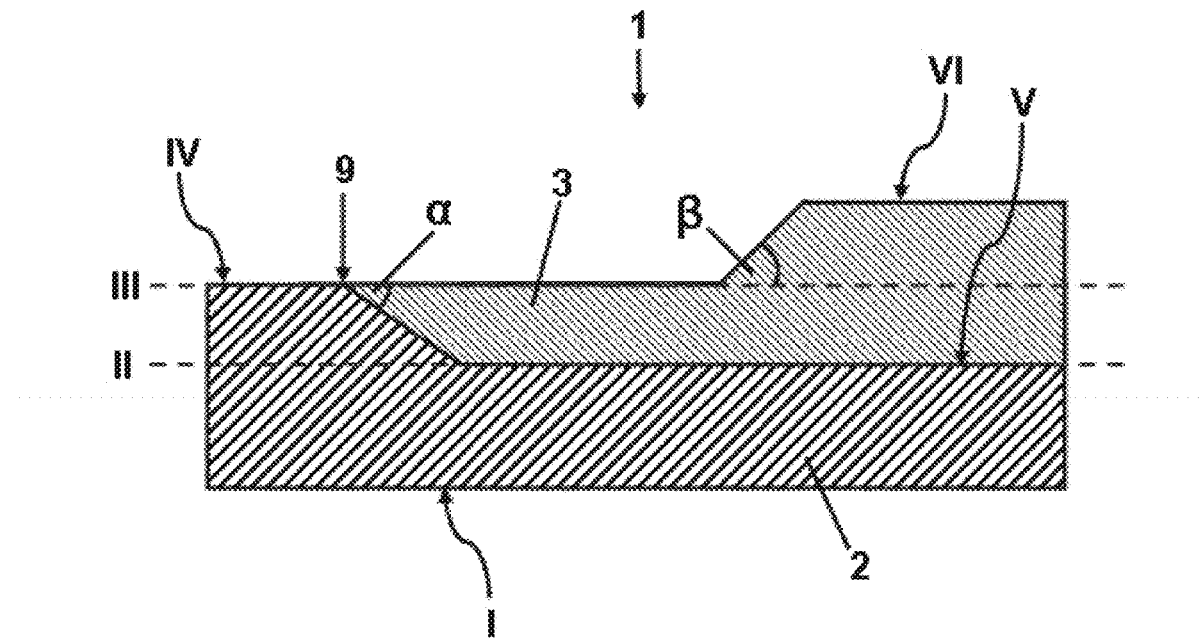
FIG. 2 shows another embodiment of the polymeric vehicle glazing according to the invention wherein the opaque polymeric component is flush mounted onto the transparent polymeric component.

FIG. 2 shows another embodiment of the polymeric vehicle glazing (1) according to the invention wherein the opaque polymeric component (3) is flush mounted onto the transparent polymeric component (2). Only the edge region of the glazing is shown. The angle α between the interface (V) and the second interior face (III) at the junction point (9) is α=35°. The slope of the interface (V) changes afterwards, wherein the angle $\alpha_1$ between the interface (V) and the second interior face (III) is $\alpha_1$=0° as the interface (V) runs identical to the first interior face (II) in this section. The inner face (IV) deviates from the second interior face (III) towards the periphery at an angle of β=50° in one section of the opaque polymeric component (3). The maximum thickness of the transparent polymeric component (2) is 5.5 mm, whereas it decreases to 3.5 mm in the edge region of the glazing. The opaque polymeric component (3) has got a maximum thickness of 5 mm, which is achieved in the edge region of the glazing and is sunken into the transparent polymeric component (2) by 2 mm in relation to the second interior face (III). The adhesive surface has got a height offset of 3 mm against the second interior face (III).

Figure 3:
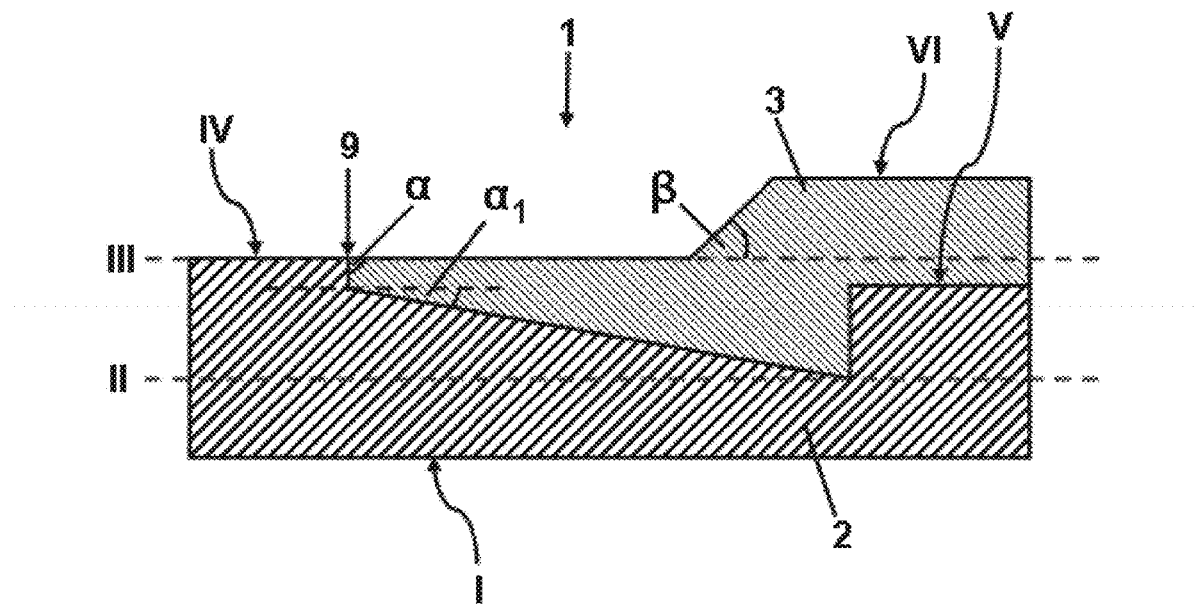
FIG. 3 shows another embodiment of the polymeric vehicle glazing according to the invention wherein the opaque polymeric component is flush mounted onto the transparent polymeric component and the design is optimized for weight reduction.

FIG. 3 shows another embodiment of the polymeric vehicle glazing (1) according to the invention wherein the opaque polymeric component (3) is flush mounted onto the transparent polymeric component (2) and the design is optimized for weight reduction. Only the edge region of the glazing is shown. The angle between the interface (V) and the second interior face (III) at the junction point (9) is α=90°. The interface changes its slope in its further progression, wherein the transition between the two slopes lies 0.6 mm beneath the surface of the inner face (IV). In this section the interface (V) deviates from the second interior face (III) towards the first interior face (II) at an angle of $\alpha_1$=10°. The interface (V) touches the first interior face (II) just in one point and proceeds in the direction of the second interior face (III), forming a rectangle angle between the transparent polymeric component (2) and the opaque polymeric component (3). Hence a recess in the opaque polymeric component (3) is generated, which is filled with the transparent polymeric component (2). The proportion of the transparent polymeric component (3) is thereby increased in relation to the opaque polymeric component (2). As the density of the transparent polymeric component (2) is lower than the density of the opaque polymeric component the weight of the polymeric vehicle glazing (1) can be advantageously reduced. The inner face (IV) deviates from the second interior face (III) towards the periphery at an angle of β=50° in one section of the opaque polymeric component (3). The adhesive surface has got a height offset of 3 mm against the second interior face (III).

Figure 4:
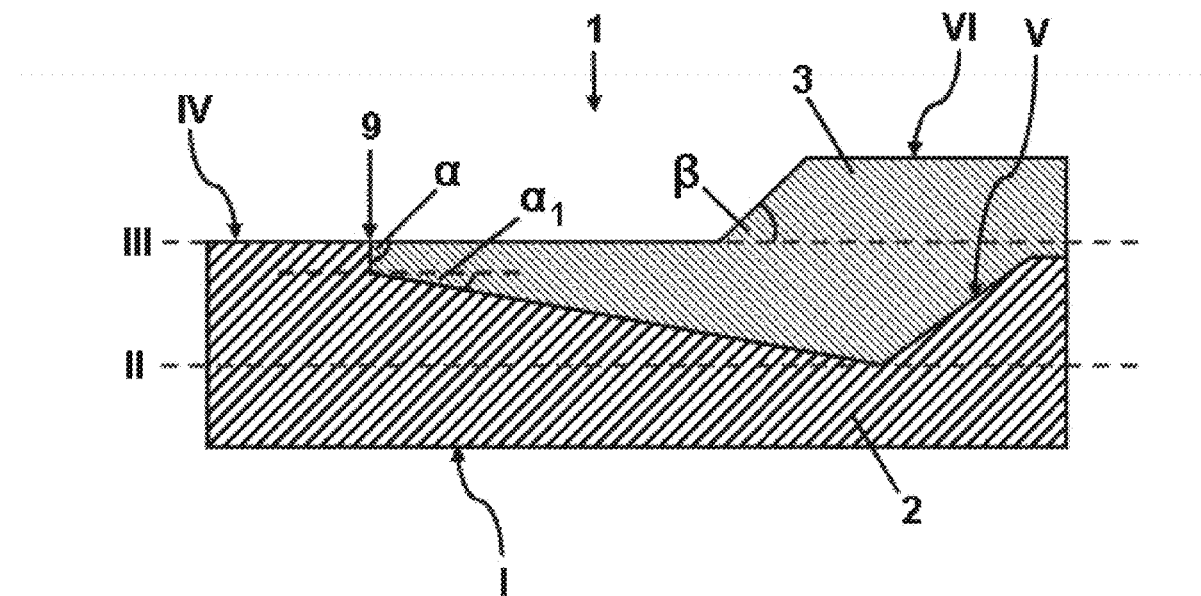
FIG. 4 shows another embodiment of the polymeric vehicle glazing according to the invention wherein the opaque polymeric component is flush mounted onto the transparent polymeric component and the design is optimized for weight reduction and demolding.

FIG. 4 shows another embodiment of the polymeric vehicle glazing according to the invention wherein the opaque polymeric component (3) is flush mounted onto the transparent polymeric component (2) and the design is optimized for weight reduction and demolding. Only the edge region of the glazing is shown. The embodiment of FIG. 3 is optimized further to enhance the demolding. The angle between the interface (V) and the second interior face (III) at the junction point (9) is α=90°. The interface changes its slope in its further progression, wherein the transition between the two slopes lies 0.6 mm beneath the surface of the inner face (IV). In this section the interface (V) deviates from the second interior face (III) towards the first interior face (II) at an angle of $\alpha_1$=10°. The interface (V) touches the first interior face (II) just in one point and proceeds in the direction of the second interior face (III). Hence a recess in the opaque polymeric component (3) is generated, which is filled with the transparent polymeric component (2). The proportion of the transparent polymeric component (3) is thereby increased in relation to the opaque polymeric component (2). As the density of the transparent polymeric component (2) is lower than the density of the opaque polymeric component the weight of the polymeric vehicle glazing (1) can be advantageously reduced. Furthermore a large vertical surface of the interface as depicted in FIG. 3 is avoided, which simplifies the demolding. The inner face (IV) deviates from the second interior face (III) towards the periphery at an angle of β=50° in one section of the opaque polymeric component (3). The adhesive surface has got a height offset of 3 mm against the second interior face (III).

Figure 5A:
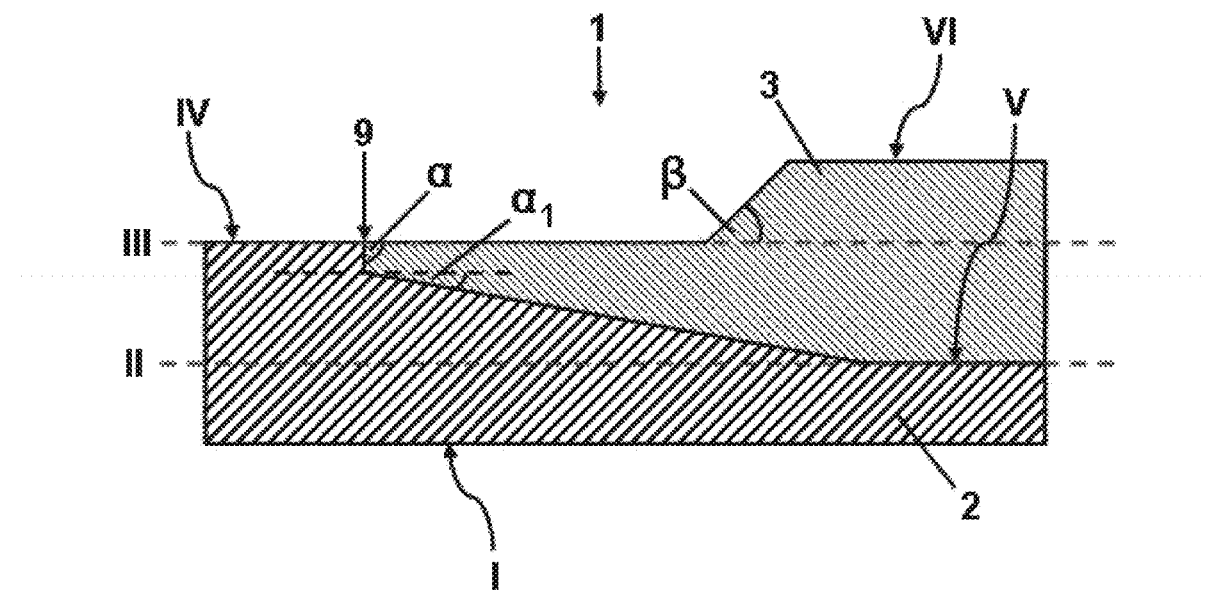
FIG. 5a shows another embodiment of the polymeric vehicle glazing according to the invention wherein the opaque polymeric component is flush mounted onto the transparent polymeric component and the design is optimized for glazing with a higher proportion of the opaque polymeric component in the edge region.

FIG. 5a shows another embodiment of the polymeric vehicle glazing (1) according to the invention wherein the opaque polymeric component (3) is flush mounted onto the transparent polymeric component (2) and the design is optimized for glazing with a higher proportion of the opaque polymeric component (3) in the edge region. Only this edge region of the glazing is shown. The angle between the interface (V) and the second interior face (III) at the junction point (9) is α=90°. The interface changes its slope in its further progression, wherein the transition between the two slopes lies 0.6 mm beneath the surface of the inner face (IV). In this section the interface (V) deviates from the second interior face (III) towards the first interior face (II) at an angle of $α_1$=10° and runs identical to the first interior face (II) after touching the first interior face. The proportion of the opaque polymeric component (3) is increased in relation to the transparent polymeric component (2) in comparison to the embodiments described so far. Such a design is especially advantageous in view of an optimization of the injection molding process as the cavity is filled out in a better way. The inner face (IV) deviates from the second interior face (III) towards the periphery at an angle of β=50° in one section of the opaque polymeric component (3). The adhesive surface has got a height offset of 3 mm against the second interior face (III).

Figure 5B:
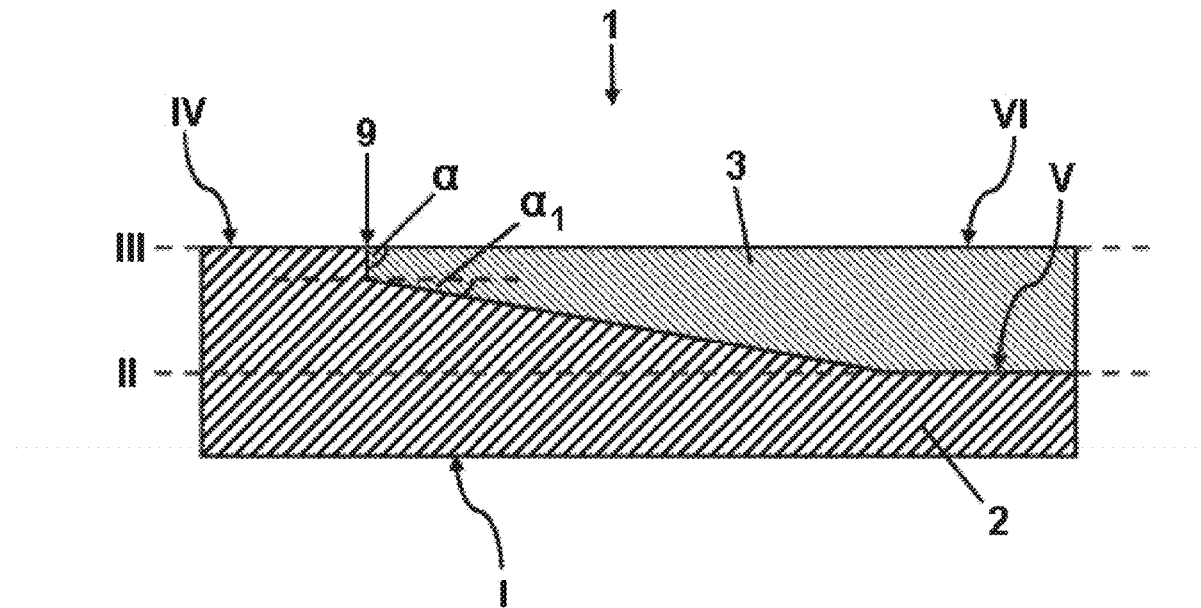
FIG. 5b shows the embodiment of the polymeric vehicle glazing depicted in FIG. 5a, wherein the adhesive surface is identical to the inner face and the angle β is β=0°.

FIG. 5b shows the embodiment of the polymeric vehicle glazing (1) depicted in FIG. 5a, wherein the adhesive surface (VI) is identical to the inner face (IV) and the angle β is β=0°. The flush design of the polymeric vehicle glazing (1) allows an enlargement of the transparent surface as the length of the opaque polymeric component is reduced compared to a glazing according to the state of the art. According to the state of the art the slope of the opaque polymeric component on the inner face (IV) starts right after the end of the interior trim of the car body, in order to completely hide the interior trim by the opaque polymeric component (3). As β is 0° in the present embodiment there is no slope on the inner face (IV) of the glazing. Hence the width of this sloped transition surface can be saved, whereby the width of the opaque polymeric component (3) is decreased and the width of the transparent polymeric component (2) is enlarged. Thus the transparent surface of the polymeric vehicle glazing (1) is advantageously enlarged. The width of the transparent surface of the polymeric vehicle glazing (1) according to FIG. 5b can be enlarged by 4 mm compared to a glazing according to the state of the art. Furthermore the package space of the polymeric vehicle glazing (1) is more compact, which is advantageous in car design and in distribution.

Figure 6A:
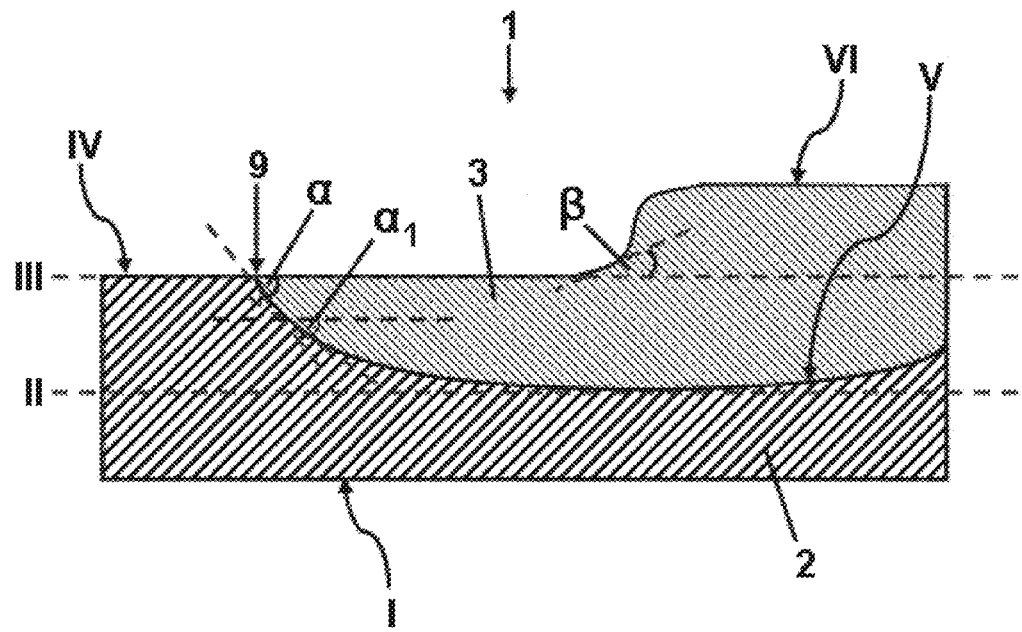
FIG. 6a shows another embodiment of the polymeric vehicle glazing according to the invention wherein the opaque polymeric component is flush mounted onto the transparent polymeric component and the interface between both components is curved.

FIG. 6a shows another embodiment of the polymeric vehicle glazing (1) according to the invention wherein the opaque polymeric component (3) is flush mounted onto the transparent polymeric component (2), wherein the interface (V) between the transparent polymeric component (2) and the opaque polymeric component (3) is curved. Only the edge region of the glazing is shown. The angles in which the interface (V) deviates from the second interior face (III) are determined by using tangents. The first tangent defining the angle α intersects the junction point (9). Initially the interface (V) deviates from the junction point (9) at an angle of α=60° towards the first interior face (II). Afterwards the slope of the interface (V) changes and the following tangent describing the further progression of the interface forms an angle of $α_1$=35° with the second interior face (III). The intersection of those two tangents lies 0.4 mm beneath the surface of the inner face (IV). The angle β is also described by using a tangent, which intersects the point where the inner face (IV) first deviates from the second interior face. The inner face (IV) deviates from the second interior face (III) towards the periphery at an angle of β=35°.

Figure 6B:
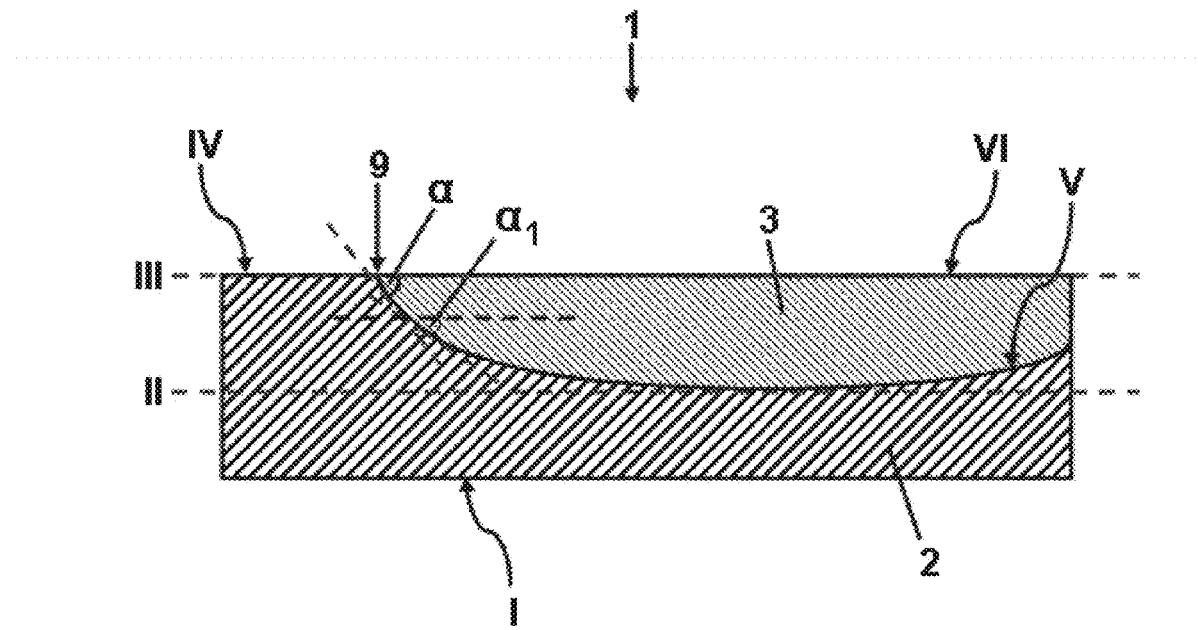
FIG. 6b shows the embodiment of the polymeric vehicle glazing depicted in FIG. 6a, wherein the adhesive surface is identical to the inner face and the angle β is β=0°.

FIG. 6b shows the embodiment of the polymeric vehicle glazing (1) depicted in FIG. 6a, wherein the adhesive surface is (VI) identical to the inner face (IV) and the angle β is β=0°. As already described in FIG. 5b the transparent surface of the polymeric vehicle glazing (1) is advantageously enlarged. The width of the transparent surface of the polymeric vehicle glazing (1) according to FIG. 6b can be enlarged by 4 mm compared to a glazing according to the state of the art. Furthermore the packing space of the polymeric vehicle glazing (1) is more compact, which is advantageous in car design and in distribution.

Figure 7:
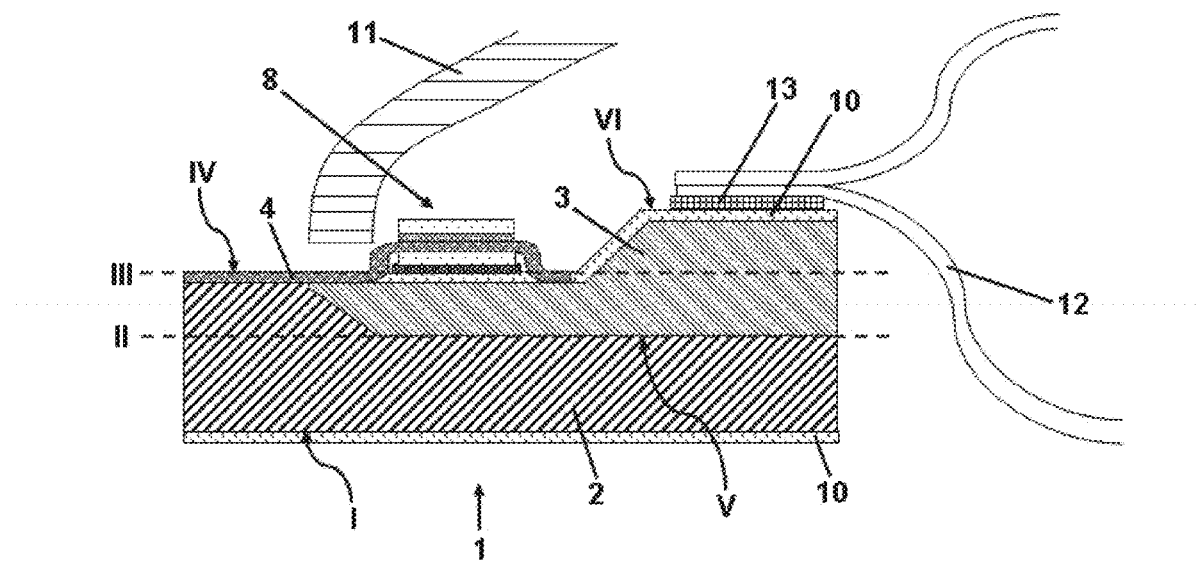
FIG. 7 shows the embodiment of the polymeric vehicle glazing of FIG. 1a equipped with a protective coating and conductive wires installed in a car body.

FIG. 7 shows the embodiment of the polymeric vehicle glazing (1) of FIG. 1a equipped with a protective coating (10) and conductive wires (4) installed in a car body. Only the edge region of the glazing is shown. The protective coating (10) is applied on the inner face (IV) and the outer face (I) of the polymeric vehicle glazing (1). The interior trim (11) is located near the region of the electrical connector (8), where it is advantageously covered by the opaque polymeric component (3). The glazing is installed by gluing the exterior trim (12) to the adhesive surface (VI) with an adhesive (13).

Figure 8:
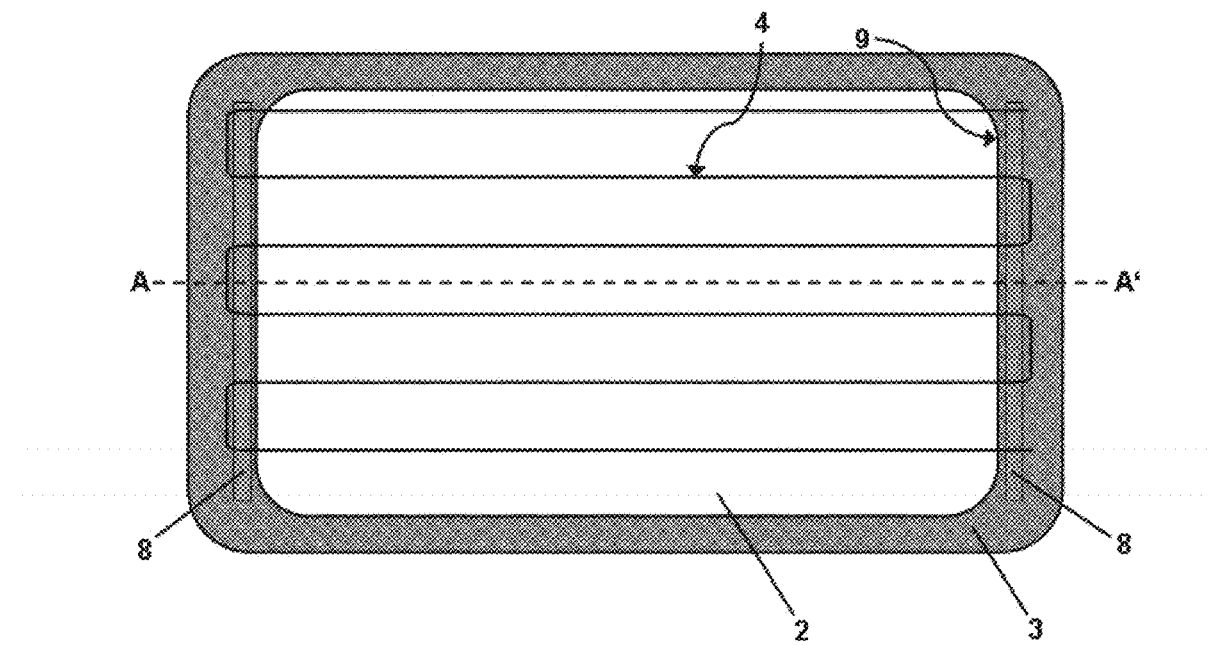
FIG. 8 shows a top view of the polymeric vehicle glazing according to the invention equipped with conductive wires and two electrical connectors.

FIG. 8 shows a top view of the polymeric vehicle glazing (1) according to the invention equipped with conductive wires (4) and two electrical connectors (8). The polymeric vehicle glazing (1) comprises a transparent polymeric component (2) framed by an opaque polymeric component (3), which is flush mounted onto the transparent polymeric component (2). The transparent polymeric component (2), the opaque polymeric component (3) and the ambient air meet at the circumferential junction point (9). The electrical connectors (8) are attached on two opposite sides of the glazing in the region of the opaque polymeric component (3), where they are advantageously hidden by the opaque polymeric component (3). The conductive wires (4) run approximately perpendicular to the electrical connectors (8) and are embedded in the transparent polymeric component (2) and a part of the opaque polymeric component (3). The conductive wires (4) protrude in one region of the opaque polymeric component (3), where they are electrically connected to the electrical connectors (8). The ends of the wires are embedded onto the opaque polymeric component (3) again. To achieve this the sonotrode is lifted up in the region above the lower bus bar (5.2) and lowered onto the surface of the opaque polymeric component (3) again afterwards. The sonotrode draws a semi-circular path to change its direction, whereat the conductive wire (4) is embedded onto the opaque polymeric component (3) along the described path. The upper bus bar (5.1) is attached on top of the lower bus bar (5.2) with conductive wire (4) afterwards.

Figure 9:
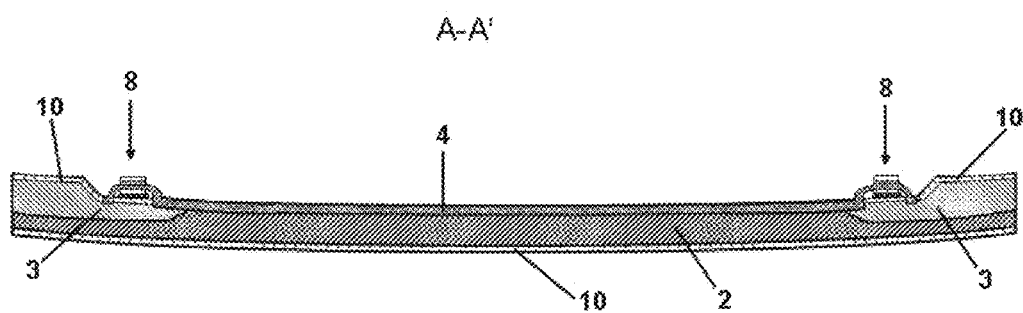
FIG. 9 shows a cross-sectional view of the polymeric vehicle glazing according to the invention equipped with conductive wires and two electrical connectors.

FIG. 9 shows a cross-sectional view of the polymeric vehicle glazing (1) according to the invention equipped with conductive wires (4) and two electrical connectors (8). The polymeric vehicle glazing (1) comprises a transparent polymeric component (2) and an opaque polymeric component (3) flush mounted in the edge region of the transparent polymeric component (2). Some examples for flush designs in the edge region of this glazing are depicted in FIGS. 1 to 6. This new design provides a smooth surface for embedding of the conductive wires (4) as there are no slopes in the region on which the embedding should take place. The conductive wires (4) are embedded onto the transparent polymeric component (2) and parts of the opaque polymeric component (3), where they protrude from the opaque material, are electrically connected to the electrical connectors (8) and embedded again afterwards. The electrical connectors are attached to the opaque polymeric component (3) and advantageously hidden by the opaque material after assembly of the glazing to the vehicle body. The opaque polymeric component (3) is equipped with a recess between the electrical connectors (8) and the edge of the glazing. The surface of the opaque polymeric component (3) has got an offset of 3 mm in the edge region compared to the surface carrying the electrical connectors (8). This upper region of the opaque component (3) is used for the adherence of the polymeric vehicle glazing (1) to the vehicle body using an adhesive. The outer surfaces of the transparent polymeric component (2) and the opaque polymeric component (3) are equipped with a protective coating (10).

FIG. 10 shows a polymeric vehicle glazing (1) according to the state of the art. The opaque polymeric component (3) is not flush mounted into the transparent polymeric component (2), but applied onto the inner face (IV). The lateral edge of the opaque polymeric component (3), which is oriented towards the middle of the glazing, is chamfered. The angle between the inner face (IV) of the opaque polymeric component (3) and the second interior face (III) is β=35°. Electrical connectors, which shall be hidden by the opaque polymeric component (2), have to be mounted on the adhesive surface (VI), where they hinder the assembly of the glazing to the car body. The embedding of conductive wires has to be accomplished on this slope of the opaque polymeric component (3) to enable a connection to the electrical connector on the upper planar adhesive surface (VI) of the opaque polymeric component (3). However the chamfered edge of the opaque polymeric component (3) exhibits a hindrance for ultrasonic integration of wires as the sonotrode does not reach into the corner and the wires are not embedded satisfactorily. Furthermore the junction (9) between the transparent polymeric component (2) and the opaque polymeric component (3) is not flush, which leads to difficulties during the coating process. At the junction (9) of the glazing the opaque polymeric component (3) and the transparent polymeric component (2) form a corner, in which coating or air bubbles within the coating might accumulate. As this corner lies within the visible region of the glazing the resulting defects lead to rejection of the part. Compared to this the junction of a glazing according to the invention is flush and the corner (if β≠0°) is hidden by the opaque polymeric component.

FIG. 11 shows a flowchart of the process for manufacturing a polymeric vehicle glazing (1) according to the invention. In a first step the opaque polymeric component (3) is flush-overmolded onto a transparent polymeric component (2) in a two-component injection molding process. The second step of the process comprises the application of a protective coating (10) onto the outer face (I) and/or the inner face (IV) of the polymeric vehicle glazing (1), preferably on the outer face (I) and the inner face (IV). In a third step of the process the lower bus bars (5.2) of the electrical connectors (8) are applied onto the inner face (IV) of the opaque polymeric component (3). The fourth step of the process comprises the ultrasonic integration of conductive wires (4) onto the inner face (IV) of the polymeric vehicle glazing (1). The ultrasonic integration is performed by driving a sonotrode over the inner face (IV) of the polymeric vehicle glazing (1). The conductive wires (4) are embedded onto the transparent polymeric component (2) and parts of the opaque polymeric component (3) and protrude from the polymeric vehicle glazing (1) in the domain of the bus bars (5). In the last step of the process the upper bus bar (5.1) is placed on top of the lower bus bar (5.2) carrying the conductive wires (4) and the electrical connection between the bus bars (5) and the conductive wires (4) is established by application of a conductive adhesive, by soldering or by welding.

REFERENCES 1 polymeric vehicle glazing
2 transparent polymeric component
3 opaque polymeric component
4 conductive wires
5 bus bars
5.1 upper bus bar
5.2 lower bus bar
6 solder
7 double-faced adhesive tape
8 electrical connectors
9 junction point
10 protective coating
11 interior trim
12 exterior trim
13 adhesive
I outer face
II first interior face
III second interior face
IV inner face
V interface
VI adhesive surface
α angle between second interior face and interface at junction point
$α_1$ angle between second interior face and interface
β angle between second interior face and inner face
AA' cross section

The invention claimed is:
1. A polymeric vehicle glazing at least comprising:
an outer face and an inner face, the outer face being a same planar face in its entirety,
a transparent polymeric component at the outer face and the inner face,
an opaque polymeric component flush mounted on the inner face in at least one section of the transparent polymeric component,
an interface connecting the transparent polymeric component and the opaque polymeric component and a junction point in which the transparent polymeric component, the opaque polymeric component and the ambient air meet,
a first interior face defined as the nearest parallel to the outer face that passes through the transparent polymeric component and the opaque polymeric component, and
a second interior face defined as the most distant parallel to the outer face that passes through the transparent polymeric component and the opaque polymeric component,
wherein at the junction point, the interface and the second interior face form an angle α, wherein α is 20° to 100° in direction of the first interior face,
wherein at a point of the interface that lies 0.1 mm to 1 mm beneath the inner face, the interface and the second interior face form an angle α1, wherein α1 is 10° to 60° in direction of the first interior face,
wherein the first interior face defines a plane of the interface nearest to the outer face, and
wherein within at least one section of the opaque polymeric component, the inner face and the second interior face form an angle ß, wherein ß is 10° to 100° in direction of the periphery.

2. The polymeric vehicle glazing according to claim 1, wherein the angle α that is formed at the junction point is 50° to 90°, in direction of the first interior face,
and wherein the point of the interface where the angle $α_1$ is formed lies 0.3 mm to 0.6 mm beneath the inner face, wherein $α_1$ is 25° to 45° in direction of the first interior face.

3. The polymeric vehicle glazing according to claim 1, wherein the inner face comprises an adhesive surface which is identical to the second interior face, or parallel to the second interior face and is 0.5 mm to 10 mm above the second interior face.

4. The polymeric vehicle glazing according to claim 3, wherein the adhesive surface is parallel to and 1 mm to 5 mm above the second interior face.

5. The polymeric vehicle glazing according to claim 1, wherein the inner face comprises at least two electrical contacts and at least one conductive wire and the electrical contacts are located on the opaque polymeric component.

6. The polymeric vehicle glazing according to claim 5, wherein the electrical contacts comprise an upper bus bar and a lower bus bar.

7. The polymeric vehicle glazing according to claim 6, wherein the conductive wires are electrically connected to the upper bus bar and the lower bus bar and the lower bus bar is glued to the opaque polymeric component.

8. The polymeric vehicle glazing according to claim 1, wherein the opaque polymeric component forms a circumferential frame enclosing the transparent polymeric component.

9. The polymeric vehicle glazing according to claim 1, wherein a thickness of the transparent polymeric component is between 1 mm and 20 mm, and a thickness of the opaque polymeric component is between 0.5 mm and 15 mm.

10. The polymeric vehicle glazing according to claim 9, wherein the thickness of the transparent polymeric component is between 2 mm and 8 mm.

11. The polymeric vehicle glazing according to claim 9, wherein the thickness of the transparent polymeric component is between 4 mm and 7 mm.

12. The polymeric vehicle glazing according to claim 9, wherein the thickness of the opaque polymeric component is between 2 mm and 8 mm.

13. The polymeric vehicle glazing according to claim 9, wherein the thickness of the opaque polymeric component is between 3 mm and 5 mm.

14. The polymeric vehicle glazing according to claim 1, wherein the transparent polymeric component contains polyethylenes, polycarbonates, polypropylenes, polystyrenes, polybutadienes, polynitriles, polyesters, polyurethanes, polymethylmethacrylates, polyacrylates, polyamides, polyethylenterephthalate, acrylonitrile butadiene styrene, styrene-acrylonitrile, acrylic ester styrene acrylonitrile, acrylonitrile butadiene styrene/polycarbonate, polycarbonate/acrylonitrile butadiene styrene, mixtures and/or copolymers thereof.

15. The polymeric vehicle glazing according to claim 14, wherein the transparent polymeric component contains polycarbonate, polymethylmethacrylate or a combination thereof.

16. The polymeric vehicle glazing according to claim 1, wherein the opaque polymeric component contains polyethylenes, polycarbonates, polypropylenes, polystyrenes, polybutadienes, polynitriles, polyesters, polyurethanes, polymethylmethacrylates, polyacrylates, polyamides, polyethylenterephthalate, acrylonitrile butadiene styrene, styrene-acrylonitrile, acrylic ester styrene acrylonitrile, acrylonitrile butadiene styrene/polycarbonate, polycarbonate/acrylonitrile butadiene styrene and/or mixtures or copolymers thereof, and at least one colorant.

17. The polymeric vehicle glazing according to claim 16, wherein the opaque polymeric component contains polycarbonate, polyethyleneterephthalate, polymethylmethacrylate or a combination thereof.

18. The polymeric vehicle glazing according to claim 16, wherein the opaque polymeric component contains acrylonitrile butadiene styrene/polycarbonate.

19. The polymeric vehicle glazing according to claim 1, wherein the polymeric vehicle glazing is coated with a protective coating comprising at least a polysiloxane, polyacrylate, polymethacrylate and/or a polyurethane, the coating having a thickness between 1 μm and 50 μm.

20. The polymeric vehicle glazing according to claim 19, wherein the protective coating has a thickness between 2 μm and 25 μm.

21. The polymeric vehicle glazing according to claim 1, wherein the angle ß is 20° to 60° in the direction of the periphery.

22. A process of manufacturing a polymeric vehicle glazing comprising:
two-component injection molding of a transparent polymeric component and an opaque polymeric component, wherein the opaque polymeric component is flush overmolded onto the transparent polymeric component,
applying a protective coating onto the outer face and/or the inner face,
applying at least one lower bus bar onto the inner face of the opaque polymeric component,
ultrasonically integrating conductive wires onto an inner face of the polymeric vehicle glazing,
applying an upper bus bar onto the at least one lower bus bar carrying the conductive wires and establishing an electrical connection of the bus bars with the conductive wires, and
obtaining the polymeric vehicle glazing, wherein the polymeric vehicle glazing comprises:
an outer face and an inner face, the outer face being a same planar face in its entirety,
a transparent polymeric component at the outer face and the inner face,
an opaque polymeric component flush mounted on the inner face in at least one section of the transparent polymeric component,
an interface connecting the transparent polymeric component and the opaque polymeric component and a junction point in which the transparent polymeric component, the opaque polymeric component and the ambient air meet,
a first interior face defined as the nearest parallel to the outer face that passes through the transparent polymeric component and the opaque polymeric component, and a second interior face defined as the most distant parallel to the outer face that passes through the transparent polymeric component and the opaque polymeric component, wherein at the junction point the interface and the second interior face form an angle α, wherein α is 20° to 100° in direction of the first interior face, wherein at a point of the interface that lies 0.1 mm to 1 mm beneath the inner face, the interface and the second interior face form an angle α1, wherein α1 is 10° to 60° in direction of the first interior face, wherein the first interior face defines a plane of the interface nearest to the outer face, and wherein within at least one section of opaque polymeric component, the inner face and the second interior face form an angle ß, wherein ß is 10° to 100° in direction of the periphery.

23. The process of manufacturing a polymeric vehicle glazing according to claim 22, wherein the protective coating is applied onto the outer face and the inner face of the polymeric vehicle glazing.

24. A method comprising:
using a polymeric vehicle glazing as automotive glazing, glazing for aviation, glazing for rail vehicles, ship glazing,
wherein the polymeric vehicle glazing comprises:
an outer face and an inner face, the outer face being a same planar face in its entirety,
a transparent polymeric component at the outer face and the inner face,
an opaque polymeric component flush mounted on the inner face in at least one section of the transparent polymeric component,
an interface connecting the transparent polymeric component and the opaque polymeric component and a junction point in which the transparent polymeric component, the opaque polymeric component and the ambient air meet,
a first interior face defined as the nearest parallel to the outer face that passes through the transparent polymeric component and the opaque polymeric component, and
a second interior face defined as the most distant parallel to the outer face that passes through the transparent polymeric component and the opaque polymeric component,
wherein at the junction point the interface and the second interior face form an angle α, wherein α is 20° to 100° in direction of the first interior face,
wherein at a point of the interface that lies 0.1 mm to 1 mm beneath the inner face, the interface and the second interior face form an angle α1, wherein α1 is 10° to 60° in direction of the first interior face,
wherein the first interior face defines a plane of the interface nearest to the outer face, and
wherein within at least one section of the opaque polymeric component, the inner face and the second interior face form an angle ß, wherein ß is 10° to 100° in direction of the periphery.

25. The method according to claim 24, wherein the polymeric vehicle glazing is used in automotives as backlite, sidelite, windshield, lamp cover, or cover for headlamps.

* * * * *